April 29, 1969　　　L. G. SIMJIAN　　　3,441,714

COMPUTING AND RECORDING SYSTEM

Filed July 6, 1965

INVENTOR.
LUTHER G. SIMJIAN

BY
Ervin B. Steinberg
AGENT.

United States Patent Office 3,441,714
Patented Apr. 29, 1969

---

3,441,714
COMPUTING AND RECORDING SYSTEM
Luther G. Simjian, Greenwich, Conn., assignor to General Research, Inc., Greenwich, Conn., a corporation of Connecticut
Filed July 9, 1965, Ser. No. 470,779
Int. Cl. G06c *29/00*
U.S. Cl. 235—61.6                    2 Claims

ABSTRACT OF THE DISCLOSURE

In a merchandise ordering system a preprinted ticket is provided which is encoded by the user to signify particular article selections. The ticket after coding by the user is inserted in a sensing means which scans sequentially the appropriate locations on the ticket to determine the presence or absence of coding. A plugboard, serving as a selectively adjustable monetary conversion unit, is provided and by means of a switching means each coded location causes an associated output signal denoting a monetary value of the article selected. A register receives the output signals and provides a total of the monetary value of the selections made on the ticket.

---

This invention generally refers to a computing and recording system and has particular reference to a computing and recording combination wherein the value of merchandise ordered on a slip or a ticket is automatically computed. More particularly, the present invention concerns a preprinted ticket which is provided with multiple choice entries of merchandise or commodities, wherein upon marking one or more selections, this ticket is inserted into a reading and sensing device which is coupled to means for computing and recording the value of the selected merchandise or commodities. Moreover, control means are provided to change the value of the merchandise without the necessity that the ticket itself be changed.

Quite specifically, this invention concerns an ordering ticket which is useful in connection with the service compartments disclosed heretofore in my U.S. Patent No. 3,130,395, issued Apr. 21, 1964, entitled, "Service Area with Compartments," and in my pending application for U.S. Letters Patent Ser. No. 466,705, filed June 24, 1965, entilted "Service Compartment" now U.S. Patent No. 3,300,016 issued Jan. 24, 1967. In this patent and application I disclose arrangements for receiving service in various types of establishments, for instance in cafeterias. The present invention concerns a ticket which is marked by the customer to indicate his selection and which ticket, upon paying the required charge, may be deposited in one of the compartments. The instant invention discloses an arrangement for computing and registering the monetary value of the selections made on the order ticket.

One of the principal objects of this invention is, therefore, the provision of a novel arrangement for computing and registering the value of ordered merchandise or commodities indicated on an order ticket.

Another object of this invention is the provision of means for receiving an order ticket, for sensing one or more indicia on the ticket, for assigning a monetary value to each of the sensed indicia and for providing a record of such value.

A further object of this invention is the provision of means for sensing a plurality of indicia on an order ticket, for assigning a monetary unit to each of the sensed indicia, and for computing the total monetary value assigned to each indicium.

A still further object of this invention is the provision of an apparatus for sensing in sequence a plurality of substantially identical indicia on a ticket, for registering the monetary value assigned to each individual indicium, and for providing a register entry of the total value represented by the respective ticket.

Figure 1:
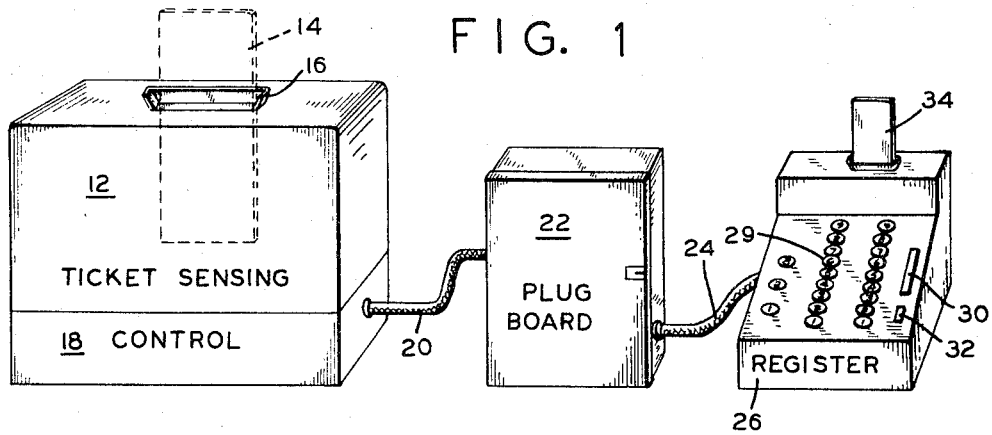
Figure 2:
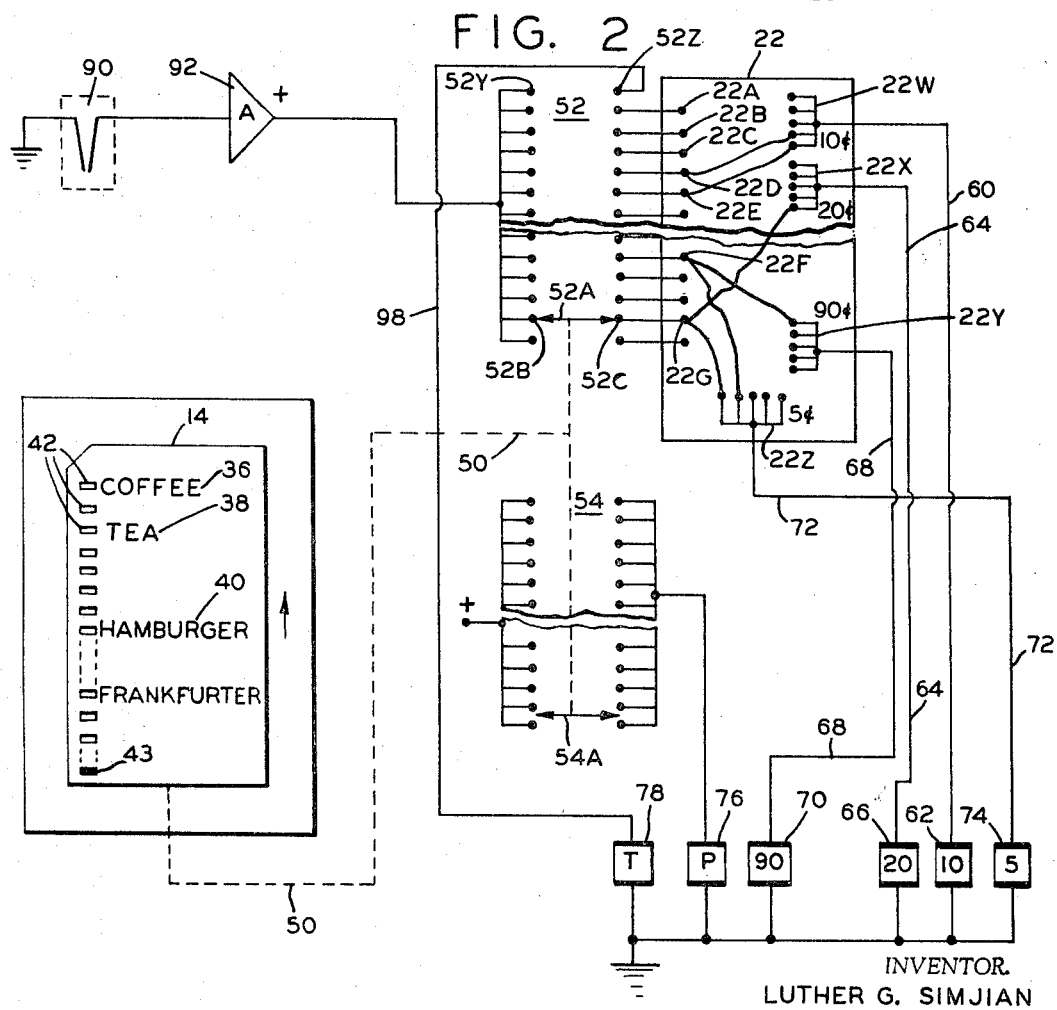

Still other and further objects of this invention will be more clearly apparent by reference to the following description when taken in conjunction with the accompanying drawings in which:

FIGURE 1 is a schematic representation of the entire computing and recording system, and FIGURE 2 is a schematic electrical circuit diagram.

Referring now to the figures and FIGURE 1 in particular, there is shown a ticket receiving and sensing means 12 which is adapted to receive at an aperture 16 a preprinted ticket 14 of suitable standardized size, for instance a tabulating card. This receiving means 12 is associated with a control means 18 which includes certain mechanical and electrical control means to be described later. A cable 20 connects the control means to a plugboard unit 22 which, in turn, is connected by a cable 24 to a register 26. The register includes a set of solenoid actuated monetary unit registering keys 29, a printing key 30, a totalizing key 32 and a record tape 34. The register is of the commercially available construction having typically keys for units from 1 to 9 cents, from 10 to 90 cents, and, in this instance, several dollar unit keys. The register is modified so that the keys, instead of being depressed manually, are set responsive to the energizing of associated solenoids mounted underneath the cover plate.

The ticket 14, typically a tabulating card, is preprinted as shown in FIGURE 2. The ticket, in the preferred embodiment, includes standardized articles or commodities, such as "coffee," numeral 36; "tea," numeral 38; "hamburger," numeral 40, and the like. Typically, the card may contain from 20 to 30 different line items. Associated with each item there is disposed at the predetermined location a small box representation 42 which is marked by the customer with a conductive graphite pencil, if he selects the respective item. As may be seen quite clearly in FIGURE 2, there are a few extra boxes 42 below each line item which serve to order multiple quantities of a respective item. For instance, in order to select two coffees, the customer marks the box opposite the word "coffee" and the next box immediately below. The marking of the box with a graphite pencil is the well-known "mark sensing" principle used widely for scoring tests. It will be apparent that, alternatively, other indicium means may be used, for instance providing a perforation to signify the applicable selection, etc.

The ticket receiving and sensing means 12 is an apparatus quite similar to the card dialing device available as an attachment for telephones. The device is adapted to receive the card and upon pushing the card to its full inward position, the card is carried upward in stepped movement whereby sensing means associated with the receiving means sense the perforation previously provided in the card, each perforation denoting a respective digit of the telephone address. Instead of the device indicated hereinabove, other sequential card sensing means, such as a rotating drum and stationary contact brushes, optical-electronic scanning means and the like may be used without departing from the principle of this invention.

Referring to FIGURE 2, the upward motion of the ticket 14 in the ticket receiving and sensing means 12 is synchronized by a mechanical linkage 50 with two stepping switches 52 and 54 which serve as the control circuit. Each of the switches 52 and 54 has a switch position corresponding to one of the boxes 42 of the ticket 14. Movement of the contact arm 52A of the switch 52 is synchronized with the movement of the ticket relative to a set of sensing brushes 90 in such a manner that when these brushes are at the area of a respective box 42 on the ticket 14, the switch arm 52A closes at a set of contacts on switch 52. Switch 54 also is synchronized with the motion of the ticket but is adjusted so that its movable contact arm 54A closes a contact on the switch array during the interval in which the movable contact arm 52A of switch 52 travels from one set of contacts to the next one. Thus, as switch arm 52A of switch 52 closes the circuit between contacts 52B and 52C, the movable contact arm 54A of switch 54 is at a position between a set of fixed contacts of switch 54 and no circuit is established at this moment at switch 54. However, as switch arm 52A steps upward, arm 54A causes briefly a connection across a set of contacts of switch 54.

The plugboard 22, having a set of input connectors, e.g. 22A, 22B, 22C, 22D, 22E, 22F, 22G and the like, is coupled to the switch 52. It may be noted that there is one such input connector for each switch position of switch 52 and, consequently, one input connector for each box 42. The plugboard has also a set of output connectors, such as multiple connectors 22W, 22X, 22Y and 22Z.

The connector 22W is connected by a conductor 60 to a solenoid 62 which actuates the "10¢" key of the register 26. Similarly, the output connector 22X is connected by a conductor 64 to the solenoid 66, the "20¢" key; output connector 22Y by a conductor 68 to the solenoid 70, the "90¢" key; output connector 22Z by a conductor 72 to the solenoid 74, the "5¢" key. It will be apparent to those skilled in the art that there are provided, but not specifically shown, similar output connectors and conductors for the remaining monetary values, e.g. 30, 40, 50, 60, 70, and 80 cents; 1 to 4 cents; 6 to 9 cents, and preferably $1 and $2. For the sake of simplicity of representation these values have been omitted from the diagram as the respective connections follow the same principle.

The operation of the present arrangement may be visualized quite clearly from the following description and by reference to the FIGURE 2.

A customer fills out a respective order ticket 14 by indicating his selection in the respective boxes, providing a small line of graphite in the respective boxes 42. The filled out ticket then is inserted into the ticket sensing device 22 and pushed to its fully received position. This action conditions the stepping switches 52 and 54, the contact arms 52A and 54A being moved to their lowermost position. As the card is moved upward in the sensing means 12, by a mechanical drive (not shown), the set of stationary contact brushes 90 sequentially senses for the presence of a conductive graphite mark in the boxes 42. As soon as the brushes 90 are connected to one another by such a conductive mark, an input signal is provided to an amplifier 92 which produces an amplified electrical output signal to the left input contact section of the switch 52.

Assuming that the second box 42 from the top on ticket 14 has been checked by a pencil indicium and that this box is being sensed by the sensing brushes 90, the movable contact 52A of the switch 52 establishes an electrical connection between the contacts 52B and 52C for the output signal from the amplifier. The contact 52C is connected to the plugboard input connector 22G. This connector is connected, in turn, by two telephone switchboard like plug cords to the output connectors 22X and 22Z, thereby associating this line item of merchandise with a monetary value of 20 cents and 5 cents, i.e. "25 cents." The signal supplied to the conductors 64 and 72 from the amplifier 92 via the switch 52 causes actuation of the solenoids 66 and 74, thus setting the "20¢" key and the "5¢" key of the register 26. As the ticket is moved out of this position by the motion within the sensing means 12, a brief period thereafter, the switch contact 54A closes a momentary circuit between a set of contacts on switch 54, thereby causing the momentary actuation of the solenoid 76 which is associated with the "print" key 30. This condition causes the value of 25¢ to be entered in the register and imprinted on the tape 34. The switch 54 serves solely to provide the "print" signal after each setting of the monetary value keys 29.

In an analogous manner, the merchandise item associated with contact 22F is keyed for 95¢, operating the solenoids 70 and 74; the item associated with the contact 22E is assigned a value of 10¢, as is the item associated with the contact 22D. It will be apparent, therefore, that each line item on the ticket 14 can be associated with a monetary value and that by means of the plugboard the price of an item can be changed at will, for instance from 15¢ to 20¢, or from 10¢ to 5¢ without affecting the preprinted ticket itself.

As the contact brushes sense the last indicium 43, which preferably is preimprinted permanently with a silver bearing ink, the movable contact 52A of the switch 52 establishes a circuit between the contacts 52Y and 52Z, thereby causing a signal via the conductor 98 to the solenoid 78 for conditioning the "totalizing" key 32. Briefly thereafter, the movable switch arm 54A establishes a circuit to the "print" solenoid 76 which causes the register to total the monetary value of all selections on the respective ticket and to zeroize the register in the known manner.

Hence, each line item on the ticket 14 is associated with a monetary value by means of the plugboard arrangement 22. As the brushes 90 sense the ticket for the presence of an indicium, line by line, the switch arm 52A is stepped in synchronism along the switch 52 and, depending upon the set-up on the plugboard, a respective monetary value is assigned to such line item and such value is entered into the register 26. Each entry is responsive to the presence of an indicium in the respective box 42 on the ticket 14. Finally, a totalizing print-out is made by means of a signal denoting the end of a respective ticket.

While the switches 52 and 54 have been shown for the sake of clarity as vertically moving switches, they may readily comprise rotary switches. Additionally, the switch 54 may be a single contact switch which is operated by a mechanical cam or a solenoid as soon as the switch arm 52A has actuated the respective keys and breaks the circuit connection. Thus, switch 54 becomes a relatively inexpensive and simple device. This switch readily may be wired, moreover, in such a manner that it is actuated only when a signal has been provided from the amplifier 92 and omitting operation when no keys on the register have been set. Additionally, the imprinted indicium 43 on the ticket 14 causing operation of the totalizing key 32 may be replaced by another sensing switch which senses that the end position of the ticket has been reached and, in response to this condition, energizes the solenoids 78 and 76.

When it is desired to provide a tally for the different product categories, additional registers can be provided to enter the individual sales, a procedure which is well known in connection with cash registers where product code keys or clerk code keys are available. Such a modification can readily be accomplished by additional plugboard connections to an associated line item on the ticket 14 and further solenoids associated with respective code keys.

The plugboard 22 may be replaced by a switch matrix or other conventional selection means, such as are well known in the art.

In summary, this disclosure shows a ticket which is adapted to be marked with an indicium or several indicia at predetermined locations to indicate selected items. This ticket is then inserted in a sensing device where the presence or absence of such indicia is established. The presence of an indicium causes a signal which then is associated with a monetary value and such value is entered in a register. The monetary value of the selections on a respective ticket are tallied. Price changes can readily be accomplished by means of circuit switching means without the need for changing the ordering ticket 14.

While there has been described and illustrated a certain preferred embodiment of the present invention and certain modifications have been indicated, it will be apparent to those skilled in the art that various further changes and modifications may be made therein without deviating from the principle and intent of this invention which shall be limited only by the scope of the appended claims.

What is claimed is:

1. A device of the type described comprising:
   a ticket of the type presenting a variety of predetermined choices to a user by means of line items, said ticket being capable of being encoded at prescribed locations associated with said line items with a respective indicium for denoting the selection of a respective line item, and being provided with a further indicium adapted to act as a control indicium for a register;
   a ticket sensing means adapted to receive said ticket and including drive means for moving said ticket past an indicium sensing means for causing said indicium sensing means to sequentially determine the selection of a respective line item by sensing the presence or absence of a respective indicium at said prescribed locations, and providing an electrical signal responsive to the presence of such indicium;
   a selective price means comprising a plugboard having a plurality of input connections, one said input connection for each of said prescribed locations, and a plurality of monetary value denoting output connections;
   connecting means for connecting each of said input connections with said output connections;
   electrical switching means coupled to said ticket sensing means and said input connections of said plugboard for sequentially connecting said indicium sensing means responsive to the moving of said ticket to a respective input connection of said plugboard, whereby to provide at said output connections by means of said connecting means a monetary value denoting electrical output signal responsive to the presence of a line item associated indicium, and
   a register device including control means coupled to be responsive to receive each of said monetary value denoting electrical output signals and in response to the receipt of a signal responsive to said further indicium on said ticket totalling the monetary value of the previously received monetary value denoting signals.

2. A device of the type described comprising:
   a ticket of the type presenting a variety of predetermined choices to a user by means of line items, said ticket being capable of being encoded at prescribed locations associated with said line items with a respective visible indicium for denoting the selection of a respective line item, and being provided with a further indicium adapted to act as a control indicium for a register;
   a ticket sensing means adapted to receive said ticket and including drive means for moving said ticket past an indicium sensing means for causing said indicium sensing means to sequentially determine the selection of a respective line item by sensing the presence or absence of a respective indicium at said prescribed locations, and providing an electrical signal responsive to the presence of such indicium;
   a selective price means comprising a plugboard having a plurality of input connections, one said input connection for each of said prescribed locations, and a plurality of monetary value denoting output connections;
   changeable connecting means for connecting each of said input connections with said output connections;
   electrical step switching means coupled to said ticket sensing means and said input connections of said plugboard for sequentially connecting said indicium sensing means synchronized with the moving of said ticket to a respective input connection of said plugboard, whereby to provide at said output connections by means of said connecting means a monetary value denoting electrical output signal responsive to the presence of a line item associated indicium, and
   a register device including control means coupled to be responsive to receive and enter in its register each of said monetary value denoting electrical output signals and in response to the receipt of a signal responsive to said further indicium on said ticket totalling the monetary value of the previously received monetary value denoting signals.

References Cited

UNITED STATES PATENTS

| | | | |
|---|---|---|---|
| 2,353,002 | 7/1944 | Armbruster | 235—91.14 X |
| 2,623,694 | 12/1952 | Peterson | 235—91.14 X |
| 2,645,416 | 7/1953 | Massa | 235—91.14 X |
| 3,035,764 | 5/1962 | Beman | 235—61.9 |
| 3,284,929 | 11/1966 | Azure | 235—61.603 |
| 3,299,298 | 1/1967 | Schinner. | |

DARYL W. COOK, *Primary Examiner.*

ROBERT M. KILGORE, *Assistant Examiner.*

U.S. Cl. X.R.

235—56